US007845715B2

(12) United States Patent

Lim

(10) Patent No.: US 7,845,715 B2

(45) Date of Patent: Dec. 7, 2010

(54) LEVEL ASSEMBLY TYPE HOOD HINGE UNIT

(75) Inventor: Sang Kyoon Lim, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 52 days.

(21) Appl. No.: 12/391,884

(22) Filed: Feb. 24, 2009

(65) Prior Publication Data

US 2010/0024170 A1 Feb. 4, 2010

(30) Foreign Application Priority Data

Aug. 4, 2008 (KR) ...................... 10-2008-0076029

(51) Int. Cl.
*B60N 99/00* (2006.01)

(52) U.S. Cl. ....................... 296/193.11; 16/319; 16/365

(58) Field of Classification Search ............ 296/193.11; 16/319, 221, 365

See application file for complete search history.

(56) References Cited

U.S. PATENT DOCUMENTS

2006/0026795 A1* 2/2006 Tonelli ........................ 16/221
2006/0200941 A1* 9/2006 Kim et al. ..................... 16/221
2006/0208531 A1* 9/2006 Waas .......................... 296/169
2007/0246281 A1* 10/2007 Parks ........................ 180/69.2

* cited by examiner

*Primary Examiner*—Lori L Lyjak

(74) *Attorney, Agent, or Firm*—Morgan, Lewis & Bockius LLP

(57) ABSTRACT

A level assembly hood hinge unit includes a side outer panel having a space between an upper panel and a lower panel in which a hood hinge may be disposed, and a stud bolt provided on the lower panel, a hinge bracket which may be configured for assembly engagement while it laterally moves along the lower panel towards the space of the side outer panel, and which may be provided with an assembly portion, positioned in the space of the side outer panel, at an upper portion of the hinge bracket and an insertion groove at a rear portion of the hinge bracket, in which the stud bolt may be inserted for stopping movement of the hinge bracket, and/or a hinge arm which may be to be assembled with the hinge bracket in the assembly portion by a hinge pin, and which may be provided with a hood combining portion to which a hood panel may be mounted at an end portion thereof.

12 Claims, 3 Drawing Sheets

LEVEL ASSEMBLY TYPE HOOD HINGE UNIT

CROSS-REFERENCE TO RELATED APPLICATIONS

The present application claims priority of Korean Patent Application Number 10-2008-0076029, filed on Aug. 4, 2008, the entire contents of which application is incorporated herein for all purposes by this reference.

BACKGROUND OF THE INVENTION

1. Field of the Invention

The present invention relates to a level assembly type hood hinge unit which can be simply assembled using a robot in the case in which a hinge point is positioned at an inner side of a side outer.

2. Description of Related Art

Recently, vehicles to which a cap forward design is applied are increasing. In the vehicle with the cap forward design, a front end of windshield glass is stretched to a more forward position of the vehicle than normal glass, i.e., a position where the front tires are disposed and a rear end of rear glass is stretched to a more rearwards position of the vehicle than in the case of normal glass, so that the entire body of the vehicle has a streamlined form, maintains a form capable of reducing air resistance in comparison with conventional vehicles, and can provide a user with a larger interior space.

In the case of adopting the cap forward design, a hinge unit of a hood panel must be disposed at a more inner side position than a side outer because the windshield glass is stretched more to the forward side. On the other hand, the side outer is a side panel of the vehicle between the hood and the windshield glass.

As for the hood employing the cap forward design, a hinge point of a hinge unit must be at an inner side position rather than the side outer, so the hood must be assembled by a level assembly method rather than a vertical assembly method.

However, in the case of assembling the hinge unit by a level assembly method, it is difficult to fix an assembly position. Accordingly, the level assembly method has a problem in that it is difficult to determine the assembly position which must be determined by trial and error repetition of manual operations. As for the hinge unit, since the hood panel is combined with the side outer in an assembled state, the level assembly has problems in that it is difficult to determine the assembly position the first time and assembly work is complex and difficult because members (for example, bolts) to be assembled which are on the side outer collide with each other.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention have been made keeping in mind the above problems occurring in the related art, and provide for a level assembly hood hinge unit which can be assembled in a short time by a precise level assembly method even in the case in which a hinge point is on the inner side of a side outer.

In accordance with various aspects of the present invention, it is possible to combine the hinge unit by allowing the hinge unit to horizontally slide even in the case in which the hinge point is at a position inside the side outer. Accordingly, assembly work becomes easy.

Further, since various aspects of the present invention provide for a panel that is assembled while it is horizontally moved in the state of being combined with the hinge arm, the hood hinge can be assembled using a robot rather than being done manually, so that the assembly workability is excellent and work labor and time are reduced.

One aspect of the present invention may be directed to a level assembly hood hinge unit including a side outer panel having a space between an upper panel and a lower panel in which a hood hinge may be disposed, and a stud bolt provided on the lower panel, a hinge bracket which may be configured for assembly engagement while it laterally moves along the lower panel towards the space of the side outer panel, and which may be provided with an assembly portion, positioned in the space of the side outer panel, at an upper portion of the hinge bracket and an insertion groove at a rear portion of the hinge bracket, in which the stud bolt may be inserted for stopping movement of the hinge bracket, and/or a hinge arm which may be to be assembled with the hinge bracket in the assembly portion by a hinge pin, and which may be provided with a hood combining portion to which a hood panel may be mounted at an end portion thereof.

A front portion of the stud bolt in the lower panel may be provided with a weld nut and the hinge bracket may be provided with an insertion hole at a position corresponding to the weld nut so that the lower panel can be combined with the side outer panel by a bolt-and-nut coupling manner.

The hinge bracket may slide to an upper surface of the lower panel of the side outer panel in a state in which the hinge bracket may be combined the hinge arm assembled with the hood panel and then may be fixed to the lower panel by a stud bolt.

The assembly portion of the hinge bracket may be lopsided toward the space of the side outer panel rather than toward the insertion hole.

The hinge bracket may include a body having an obtuse-triangle shape, an assembly portion provided at an upper point of the body, a horizontal flange provided at a lower end of the body, and/or an insertion groove provided at a rear end portion of the horizontal flange.

The rear end of the horizontal flange may be provided with a guide portion which may be sloped toward the insertion groove so that the stud bolt may be guided to the insertion groove by the guide portion.

The upper panel of the side outer panel may extend to a position at which it can meet with a hood panel and the lower panel may be formed to horizontally extend from a lower end portion of the upper panel toward a front side of the upper panel.

Other aspects of the present invention are directed to vehicle hood assemblies including the above-described hood panels and level assembly hood hinge units, and further still to passenger vehicles including the same.

Another aspect of the present invention is directed to a hood hinge for attachment to a side outer panel including an upper panel and a lower panel with a space therebetween, wherein a bolt may be provided on the lower panel, the hinge including a hinge bracket including an insertion groove configured for the bolt to be inserted therein, a hinge arm configured for attachment to a hood panel, and/or a hinge pin, hingedly connecting the hinge arm to the hinge bracket, wherein the hinge may be configured and dimensioned such that when the bolt may be disposed in the insertion groove, the hinge pin may be disposed in the space of the side outer panel.

The lower panel further may include a nut, the hinge may include an insertion hole at a position corresponding to the nut such that an additional bolt can be inserted through both the insertion hole and the nut when the hinge may be positioned with the bolt disposed in the insertion groove. The hinge pin may be disposed farther into the space of the side outer panel than the insertion hole. The hinge may include a shape of an obtuse triangle. The hinge may include a flange in which the insertion groove may be provided, wherein the flange further may include a guide portion which may be sloped toward the insertion groove so that the stud bolt may be guided to the insertion groove by the guide portion.

Other aspects of the present invention are directed to vehicle hood assemblies including the above-described hood panels and hood hinges, and further still to passenger vehicles including the same.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
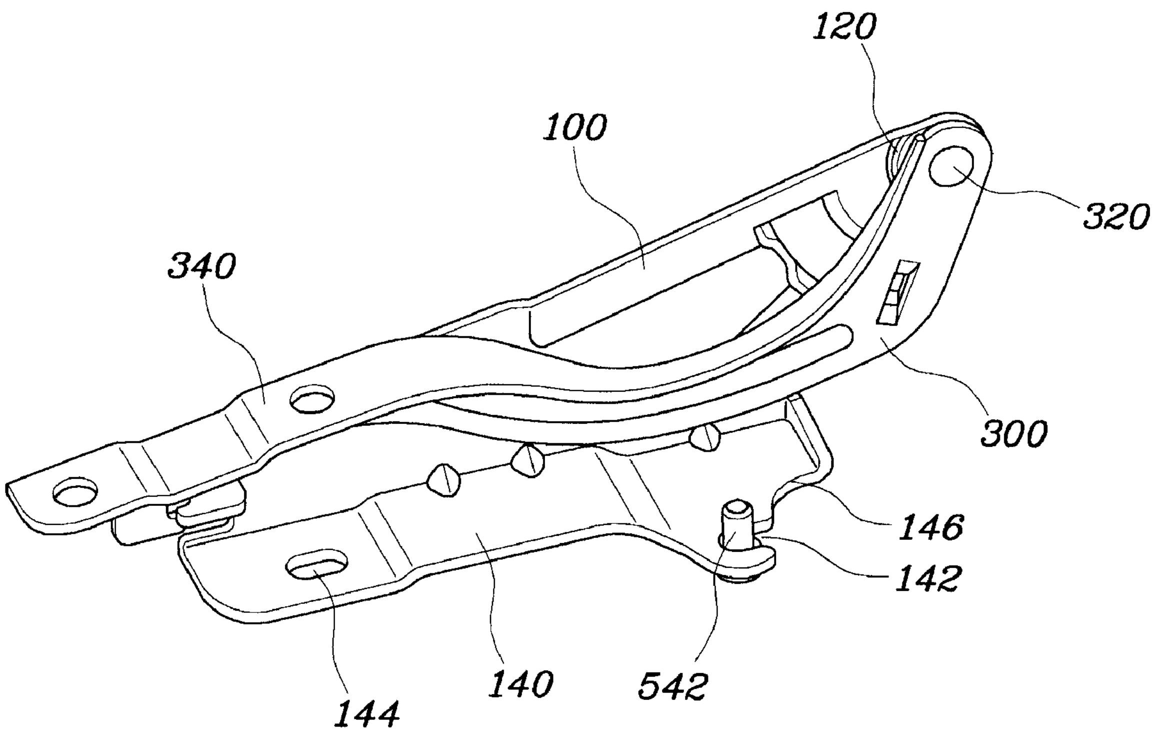
FIG. 1 is a perspective view illustrating an exemplary level assembly hood hinge unit according to one embodiment of the invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The level assembly type hood hinge includes a side outer panel 500 having an upper panel 520, a lower panel 540, a space formed between the upper panel 520 and the lower panel 540, and a stud bolt 542 provided on the lower panel 540. The level assembly type hood hinge further includes a hinge bracket 100 and a hinge arm 300. The hinge bracket 100 horizontally extends along the lower panel 540 towards a space 560 of the side outer panel 500. The hinge bracket 100 has an assembly portion 120 which is provided at an upper portion of the hinge bracket and which is to be positioned in the space of the side outer panel 500 and has an insertion groove 142, in which the stud bolt 542 is inserted to stop movement of the hinge bracket, at a rear end portion of the hinge bracket. The hinge arm 300 is assembled in the assembly portion 120 of the hinge bracket 100 by a hinge pin 320 and is provided in a hood combining portion 340 (with which a hood panel 10 is combined) at an end portion thereof. The stud bolt is a male coupling unit inserted in or integrally formed on the panel.

FIG. 1 is a perspective view illustrating a level assembly hood hinge unit according to various embodiments of the invention. Elements of the level assembly hood hinge unit will be explained with reference to FIG. 1.

Figure 3:
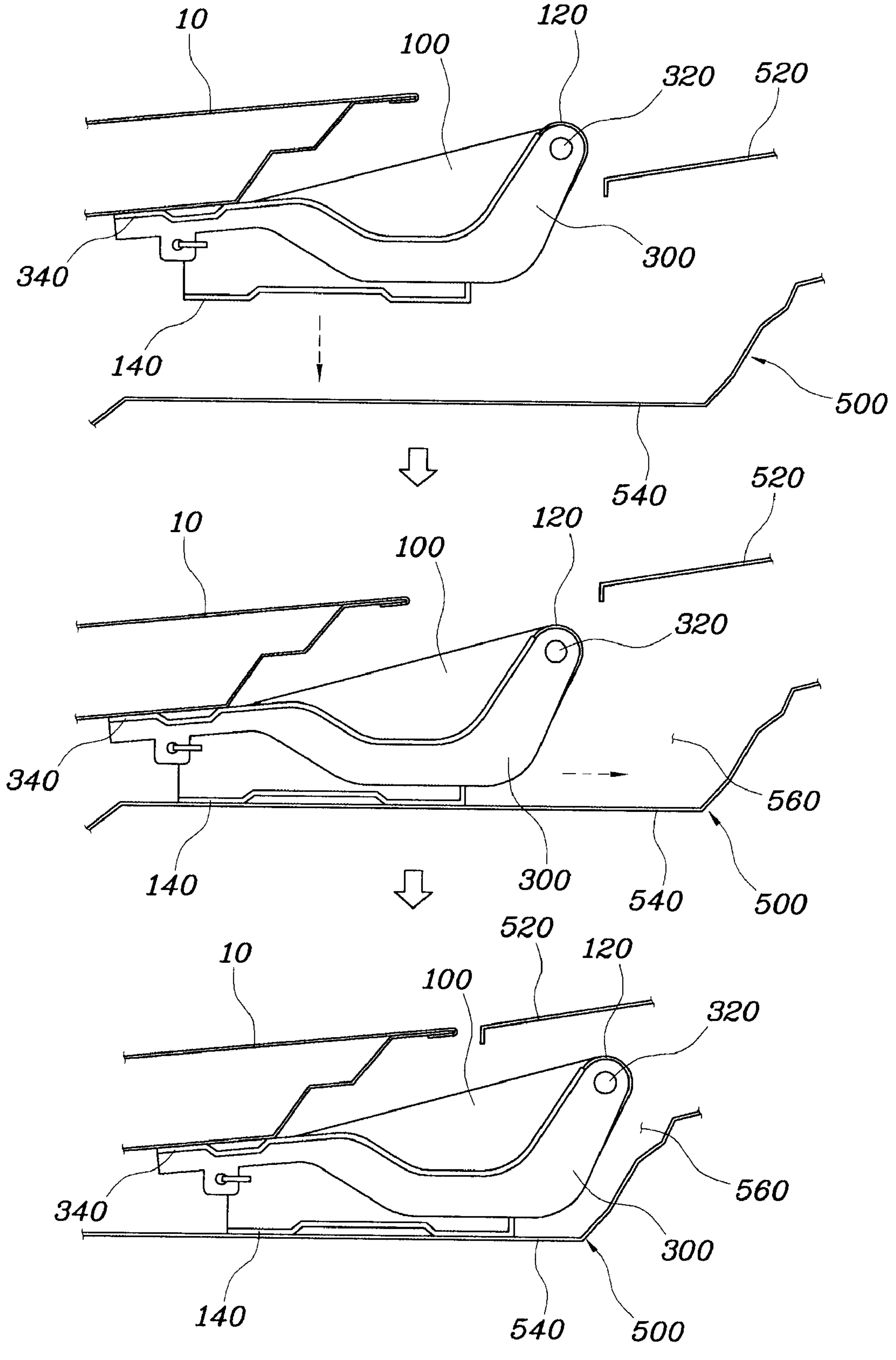
FIG. 3 is a flowchart illustrating an exemplary assembly sequence of the level assembly type hood hinge of FIG. 1.
Figure 4:
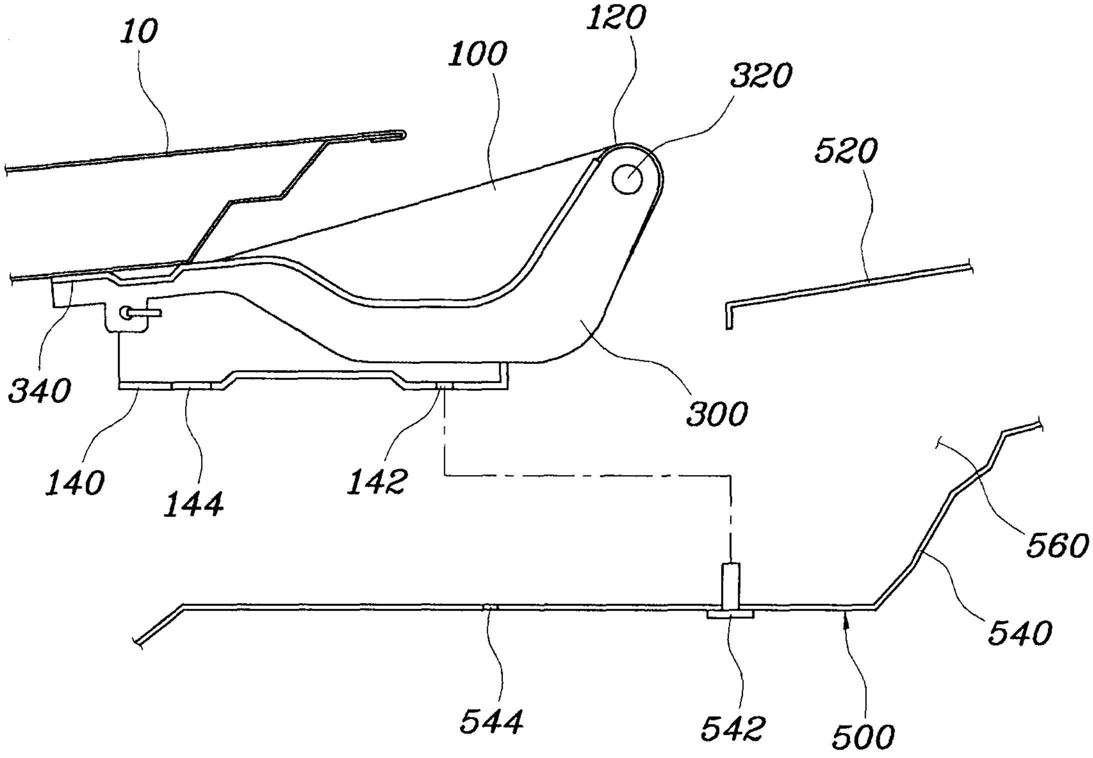
FIG. 4 is a view illustrating an exemplary method of assembling the level assembly hood hinge unit of FIG. 1.

The level assembly hood hinge unit includes the side outer, the hinge bracket, and the hinge arm. For reference, the structure of the side outer panel will be described with reference to FIG. 3 and FIG. 4. In FIGS. 3 and 4, the front of the vehicle is to the left, and the front edge of the windshield will later be attached to the leftmost edge of the upper panel 520. The hinge bracket 100 is combined with the side outer panel in the state of being combined with the hinge arm 300. The rear end portion of the hinge bracket 100 is provided with the insertion groove 142 and the upper end portion of the hinge bracket 100 is provided with the assembly portion 120. The side outer is provided with the stud bolt 542. In the case in which the hinge bracket 100 is horizontally moved, the stud bolt 542 of the side outer panel 500 is engaged with the insertion groove 142 of the hinge bracket 100. The insertion groove 142 is formed at a rear portion of a horizontal flange 140 which is horizontally engaged with the lower end of the hinge bracket.

Figure 2:
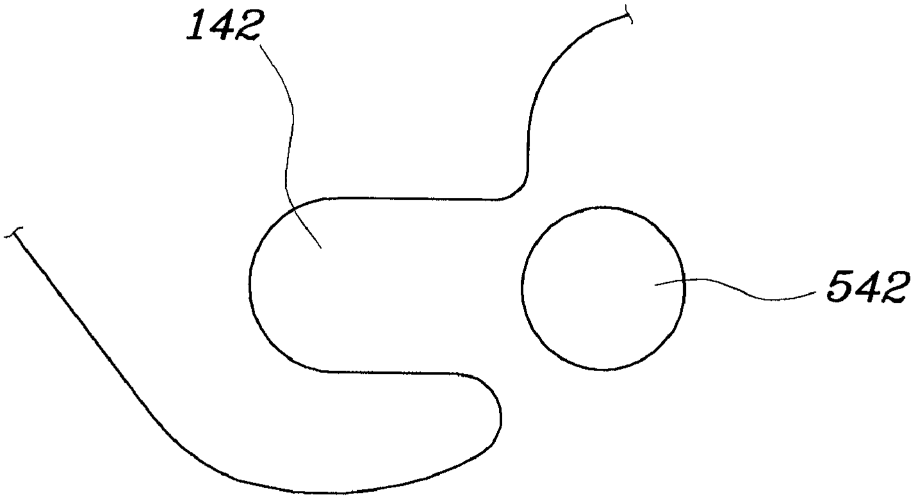
FIG. 2 is a view illustrating an exemplary combined structure of an insertion groove and a stud bolt of the level assembly type hood hinge of FIG. 1.

The engagement of the insertion groove 142 and the stud bolt 542 will be described with reference to FIGS. 1 and 2 according to movement of the hinge bracket 100. A guide portion 146 is formed at the rear end portion of the horizontal flange 140 and is inclined toward the insertion groove 142.

An insertion length of the hinge bracket 100 is limited to the position at which the insertion groove 142 is engaged with the stud bolt 542. The stud bolt 542 and the insertion groove 142 are positioned at a designed position which is determined according to a control mechanism of each vehicle. Accordingly, the engagement between the stud bolt and the insertion groove serves to fix the position of the hinge bracket 100. The hinge bracket 100 is horizontally moved until the stud bold 542 is inserted into the insertion groove 142, and then a nut is engaged with the stud bolt 542. In such a manner the hinge bracket 100 is assembled. For such a reason, assembly work becomes simplified and work labor and time are reduced, resulting in an increase in productivity.

The structure of the hinge bracket 100 includes a triangular body with an obtuse triangle shape, the back side of which is inclined, an assembly portion 120 provided at the top corner of the triangular body, a horizontal flange 140 provided at the bottom of the body, and the insertion groove 142 provided at the rear end portion of the horizontal flange 140. The assembly portion 120 of the upper end portion of the hinge bracket 100 is lopsided toward the space 560 of the side outer panel 500. In the case in which the hinge bracket 100 has the above-mentioned structure, the hinge point is disposed inside the side outer panel. Accordingly, the wind shield glass can be inclined further toward the front of the vehicle while the hinge point is not exposed outside the side outer panel.

The hinge arm 300 is combined with the assembly portion 120 of the hinge bracket 100 by the hinge pin 320. The hinge arm 300 pivots has an end of the hinge arm 300 is coupled around the assembly portion 120. The hood panel 10 is fixed to the other end of the hinge arm 300 which forms a rotating center when the hood panel is open and closed. The assembly portion 120 to which the hinge arm 300 and the hinge bracket 100 are fixed is disposed inside the inner space of the side outer panel, beneath the upper panel 520.

FIG. 3 is a flowchart showing the assembly sequence of the level assembly hood hinge unit according to various embodiments the invention. The side outer panel 500 is a panel disposed at a position at which the wind shield glass and the hood meet and includes an upper panel 520 and a lower panel 540. The hinge point of the hood is provided inside the space 560 of the side outer panel 500 and therefore the hinge bracket 100 is combined with the side outer panel 500 by being slid rightwards in FIG. 3. The upper panel 520 of the side outer panel 500 extends to a position at which it meets the hood panel 10 and the lower panel 540 is formed to horizontally extend from the lower end of the upper panel 520 toward the front side of the upper panel 520.

The hood panel 10 is combined with the hinge arm 300 of the hinge bracket 100 by the hinge pin 320 the hinge bracket 100 is lowered down in a vertical direction and moved in a horizontal direction, that is, slid to the right in FIG. 3 to be combined with the side outer panel 500. The assembly portion 120 of the hinge bracket 100 is disposed inside the space 560 of the side outer panel 500. Therefore the hinge point is not visible. In the case of horizontally moving the hinge bracket 100, the assembly work is not easy for the following reason: since the side outer 500 is combined after both of the hinge arm 300 and the hood panel 100 are combined with the hinge bracket 100, if error occurs when determining the assembly position, the assembly work must be performed after the hinge bracket 100 is removed from the side outer. The hinge unit must be assembled manually owing to the characteristics of such assembly work.

According to the level assembly hood hinge unit according to various embodiments of the invention, the assembly position of the hinge unit at which the hinge bracket is combined with the side outer panel 500 is easily determined by the engagement between the insertion groove 142 provided in the hinge bracket 100 and the stud bolt 542 of the side outer panel 500. Accordingly, the hinge unit can be automatically assembled using a robot. According to the level assembly hood hinge unit, the hinge bracket 100 with which the hood panel 10 and the hinge arm 300 are combined is horizontally moved by a robot and thus the assembly position of the hinge unit is easily and automatically determined. Further, the assembled structure of the hinge unit is easily bolted together after determining the assembly position. Accordingly, there is no need for manual repetition of the work.

A coupling structure between elements of the level assembly hood hinge unit will be described with reference to FIG. 4. The side outer 500 includes the upper panel 520 and the lower panel 540 between which a space 560 is formed. The lower panel 540 is provided with the stud bolt 542 and a weld nut 544. The hinge arm 300 is assembled with the hinge bracket 100 by the hinge pin 320, and the hinge arm 300 is also combined with the hood panel 10. When the hinge bracket 100 is horizontally moved by a robot, the stud bolt 542 is inserted into the insertion groove 142 formed in the horizontal flange 140 of the hinge bracket 100. A nut is then attached to the stud bolt 542 and then a bolt is attached to weld nut 544 through the insertion hole 144 of the hinge bracket 100, completing the assembly of the hinge unit. The weld nut is a nut inserted in the panel or a female coupling unit integrally formed on the panel.

The hinge bracket 100 is provided with the insertion hole 144 at a position corresponding to the weld nut 544. The insertion hole 144, like the insertion groove 142, is formed at a lower end of the horizontal flange 140.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A level assembly hood hinge unit comprising:

a side outer panel having a space between an upper panel and a lower panel in which a hood hinge is disposed, and a stud bolt provided on the lower panel;

a hinge bracket which is configured for assembly engagement by being laterally moved along the lower panel towards the space of the side outer panel, and which is provided with an assembly portion, positioned in the space of the side outer panel, at an upper portion of the hinge bracket and an insertion groove at a rear portion of the hinge bracket, in which the stud bolt is inserted for stopping movement of the hinge bracket; and a hinge arm which is to be assembled with the hinge bracket in the assembly portion by a hinge pin, and which is provided with a hood combining portion to which a hood panel is mounted at an end portion thereof.

2. The level assembly hood hinge unit according to claim 1, wherein a front portion of the stud bolt in the lower panel is provided with a weld nut and the hinge bracket is provided with an insertion hole at a position corresponding to the weld nut so that the lower panel can be combined with the side outer panel by a bolt-and-nut coupling manner.

3. The level assembly hood hinge unit according to claim 1, wherein the hinge bracket slides to an upper surface of the lower panel of the side outer panel in a state in which the hinge bracket is combined the hinge arm assembled with the hood panel and then is fixed to the lower panel by a stud bolt.

4. The level assembly hood hinge unit according to claim 1, wherein the assembly portion of the hinge bracket is lopsided toward the space of the side outer panel rather than toward the insertion hole.

5. The level assembly hood hinge unit according to claim 1, wherein the hinge bracket includes a body having an obtuse-triangle shape, an assembly portion provided at an upper point of the body, a horizontal flange provided at a lower end of the body, and an insertion groove provided at a rear end portion of the horizontal flange.

6. The level assembly hood hinge unit according to claim 5, wherein the rear end of the horizontal flange is provided with a guide portion which is sloped toward the insertion groove so that the stud bolt is guided to the insertion groove by the guide portion.

7. The level assembly hood hinge unit according to claim 1, wherein the upper panel of the side outer panel extends to a position at which it can meet with a hood panel and the lower panel is formed to horizontally extend from a lower end portion of the upper panel toward a front side of the upper panel.

8. A hood hinge for attachment to a side outer panel comprising an upper panel and a lower panel with a space therebetween, wherein a bolt is provided on the lower panel, the hinge comprising:

a hinge bracket comprising an insertion groove configured for the bolt to be inserted therein;

a hinge arm configured for attachment to a hood panel; and a hinge pin, hingedly connecting the hinge arm to the hinge bracket;

wherein the hinge is configured and dimensioned such that when the bolt is disposed in the insertion groove, the hinge pin is disposed in the space of the side outer panel.

9. The hinge according to claim 8, wherein the lower panel further comprises a nut, the hinge further comprising an insertion hole at a position corresponding to the nut such that an additional bolt can be inserted through both the insertion hole and the nut when the hinge is positioned with the bolt disposed in the insertion groove.

10. The hinge according to claim 8, wherein the hinge pin is disposed farther into the space of the side outer panel than the insertion hole.

11. The hinge according to claim 8, wherein the hinge comprises a shape of an obtuse triangle.

12. The hinge according to claim 8, further comprising a flange in which the insertion groove is provided, wherein the flange further comprises a guide portion which is sloped toward the insertion groove so that the stud bolt is guided to the insertion groove by the guide portion.

* * * * *